(12) United States Patent
Glejbol et al.

(10) Patent No.: US 9,303,463 B2
(45) Date of Patent: Apr. 5, 2016

(54) RISER AND AN OFFSHORE SYSTEM

(71) Applicant: National Oilwell Varco Denmark I/S, Brondby (DK)

(72) Inventors: Kristian Glejbol, Glostrup (DK); Niels J. Rishoj Nielsen, Dragor (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 0 days.

(21) Appl. No.: 14/405,951

(22) PCT Filed: Jun. 3, 2013

(86) PCT No.: PCT/DK2013/050168
§ 371 (c)(1),
(2) Date: Dec. 5, 2014

(87) PCT Pub. No.: WO2013/182196
PCT Pub. Date: Dec. 12, 2013

(65) Prior Publication Data
US 2015/0275586 A1    Oct. 1, 2015

(30) Foreign Application Priority Data

Jun. 6, 2012 (DK) .............................. PA 2012 70301

(51) Int. Cl.
*E21B 17/01* (2006.01)
*E21B 17/08* (2006.01)
(Continued)

(52) U.S. Cl.
CPC ............... *E21B 17/01* (2013.01); *E21B 17/085* (2013.01); *F16L 11/083* (2013.01); *F16L 33/01* (2013.01)

(58) Field of Classification Search
CPC .............................. E21B 17/01; E21B 17/015
USPC ............................ 166/367; 138/129, 130, 155
See application file for complete search history.

(56) References Cited

U.S. PATENT DOCUMENTS 6,039,083 A * 3/2000 Loper ........................... 138/135
6,152,170 A 11/2000 Nouveau et al.
(Continued)

FOREIGN PATENT DOCUMENTS

GB          234994 A     6/1925
GB         2481175 A    12/2011
(Continued)

OTHER PUBLICATIONS

Application No. DK PA 2011 00334; Dated May 2, 2011; Which Corresponds with International Application No. PCT/DK2012/050137.
(Continued)

*Primary Examiner* — Matthew R Buck
(74) *Attorney, Agent, or Firm* — Pearne & Gordon LLP

(57) ABSTRACT

The invention relates to a riser for transporting fluid between an upper facility and a subsea facility. The riser has a center axis and a length along the center axis and comprises an unbonded flexible metal armored riser section and an unbonded flexible composite armored riser section arranged in fluid connection to each other. The metal armored riser section comprises at least two cross-wound tensile armor layers each comprising a plurality of helically wound elongate metal armor elements wound with a winding angle of about 60 degree or less relative to the center axis. The composite armored riser section comprises at least one tensile armor layer comprising a plurality of helically wound elongate composite armor elements wound with a winding angle of about 60 degree or less relative to the center axis.

The invention also relates to an offshore system comprising such riser.

36 Claims, 12 Drawing Sheets

(51) Int. Cl.
*F16L 11/08* (2006.01)
*F16L 33/01* (2006.01)

(56) References Cited

U.S. PATENT DOCUMENTS

| | | | |
|---|---|---|---|
| 6,165,586 A | 12/2000 | Nouveau et al. | |
| 6,273,142 B1* | 8/2001 | Braad | 138/109 |
| 6,360,781 B1* | 3/2002 | Braad | 138/109 |
| 6,364,022 B1* | 4/2002 | Kodaissi et al. | 166/367 |
| 6,401,760 B2* | 6/2002 | Espinasse | 138/135 |
| 6,412,825 B1* | 7/2002 | Langkjaer | 285/222.2 |
| 7,303,213 B2* | 12/2007 | Rytter | 285/222.1 |
| 7,842,149 B2* | 11/2010 | Glejbol et al. | 156/169 |
| 8,112,863 B2* | 2/2012 | Eccleston et al. | 29/407.1 |
| 8,733,446 B2* | 5/2014 | Espinasse | E21B 17/012 166/344 |
| 8,783,358 B2* | 7/2014 | Critsinelis et al. | 166/344 |
| 8,857,521 B2* | 10/2014 | Clements | 166/352 |
| 2008/0145583 A1 | 6/2008 | Bryant | |
| 2008/0149209 A1* | 6/2008 | Felix-Henry | 138/127 |
| 2012/0241040 A1* | 9/2012 | Fogg | 138/172 |
| 2013/0291993 A1* | 11/2013 | Ruby | F16L 9/147 138/153 |
| 2014/0079512 A1 | 3/2014 | Christensen | |

FOREIGN PATENT DOCUMENTS

| | | |
|---|---|---|
| WO | 00/17479 A1 | 3/2000 |
| WO | 00/22336 A1 | 4/2000 |
| WO | 00/70256 A1 | 11/2000 |
| WO | 01/07818 A1 | 2/2001 |
| WO | 01/51839 A1 | 7/2001 |
| WO | 2005/043020 A1 | 5/2005 |
| WO | 2006/059220 A2 | 6/2006 |
| WO | 2010/091691 A1 | 8/2010 |
| WO | 2011/064591 A2 | 6/2011 |
| WO | 2012/092931 A1 | 7/2012 |
| WO | 2013/189496 A1 | 12/2013 |

OTHER PUBLICATIONS

Application No. DK PA 2011 00371; Dated May 13, 2011; Which Corresponds with International Application No. PCT/DK2012/050122.

Application No. DK PA 2012 00185; Dated May 2, 2011; Which Corresponds with International Application No. PCT/DK2013/050063.

Application No. DK PA 2012 00259; Dated Apr. 12, 2012; Which Corresponds with International Application No. PCT/DK2013/050096.

"Recommended Practice for Flexible Pipe"; ANSI/API Recommended Practice; 17B, Fourth Edition, Jul. 2008; pp. 1-213.

"Specification for Unbonded Flexible Pipe"; ANSI/API Specification 17J; Third Edition, Jul. 2008; pp. 1-73.

* cited by examiner

US 9,303,463 B2

RISER AND AN OFFSHORE SYSTEM

TECHNICAL FIELD

The present invention concerns a riser for an offshore system as well as an offshore system for subsea fluid transportation in particular for deep water applications and for transportation of water or aggressive fluids, such a petrochemical products, e.g. from a production well to a sea surface installation.

BACKGROUND ART

Risers and offshore systems comprising such riser or risers are well known in the art. Such risers are usually applied for subsea fluid transportation of fluids such as petrochemical products, e.g. from a subsea facility e.g. a production well to an upper facility e.g. a sea surface installation. Examples of well known risers include steel catenary risers (SCR) e.g. as described in WO2011/064591, metallic rigid risers, flexible risers e.g. as described in standard "Recommended Practice for Flexible Pipe", ANSI/API 17 B, fourth Edition, July 2008, and the standard "Specification for Unbonded Flexible Pipe", ANSI/API 17J, Third edition, July 2008 as well as any other offshore pipes for fluid transport between facilities arranged at different water levels.

Such risers are often very long in particular when they are arranged for deep water applications e.g. for production at deep water fields. Such riser will therefore usually be subjected to different sea depths, and thereby the different length sections of the riser will be subjected to different conditions such as current, waves and tides.

Furthermore, when the upper facility is a floating unit, the riser will be subjected to large movements, which requires high flexibility of the riser.

In order to alleviate large movements of floating units e.g. floating units of offshore site systems such as FPSO units (floating production, storage and offloading units) or FSO units (floating storage and offloading units), it has for many applications been desired to use flexible pipes in particular for deep water applications. However, for deep water applications such flexible risers are very heavy and must be supported with positive buoyancy modules at several positions along its length so as to distribute the suspended weight between the upper and lower parts of the riser. Such buoyancy arrangement is expensive, difficult to install and to control, and it is therefore generally undesired to rely on such complicated buoyancy arrangements.

In U.S. Pat. No. 6,364,022 a hybrid pipe for deep water is described, comprising a metallic rigid central part having an upper end, which is connected to an upper portion of a flexible pipe of predetermined length and having a lower end, which is connected to a lower portion of the flexible pipe of a length at least equal to the length of the upper portion of the flexible pipe. It is described that the advantage is the riser obtained is rigid for the most part and has the properties of flexible pipes where it leads off from the surface support and where it touches down on the sea bed. Thereby the upper flexible portion takes up all of the weight of the central rigid part and of the lower flexible portion, whereas the latter takes up practically all the dynamic stresses generated by the movements of the surface support.

However, for applications in very dynamic systems, such as where the riser will be subjected to very high dynamic stress e.g. generated by movement of the upper facility or due to weather conditions and/or tides, there is a need for improved riser systems compared to the above described hybrid riser, since in practice the metallic rigid central part provides an undesired stiffness to the system, which results in that the flexible pipe sections will be subjected to excessive and often uncontrolled stress immediately adjacent to their respective connection to the metallic rigid central part.

DISCLOSURE OF INVENTION

An object of the present invention is to provide an alternative riser for an offshore system as well as an offshore system for subsea fluid transportation in particular for deep water application wherein at least one of the above difficulties has been at least partly alleviated.

In particular it is an object of the invention to provide a riser for an offshore system which riser is sufficiently strong and durable for deep water applications, and where neither metallic rigid central part nor complicated buoyancy arrangements are required.

These and other objects have been solved by the invention as defined in the claims and as described herein below.

It has been found that the invention and embodiments thereof have a number of additional advantages which will be clear to the skilled person from the following description.

The riser of the invention is suitable for transporting fluid between an upper facility and a subsea facility. The terms "upper facility" and "subsea facility" are used herein to indicate a relative position where the upper facility is arranged vertically higher than the subsea facility i.e. the upper facility is arranged in a plane vertically above the plane comprising the subsea facility. In other words, the upper facility need not be arranged directly above the subsea facility but merely at a higher level.

The upper facility can for example be a floating unit such as a floating platform or a vessel or a stationary unit. The upper facility will usually be arranged near the water line, such as within from about 25 m above the water line to about 100 m below the water line.

The term "water line" means the water line at still water. Unless specifically mentioned all distances and determinations in relating to the water line are made at still water at average water level.

The riser has a center axis and a length along the center axis and comprises an unbounded flexible metal armored riser section and an unbonded flexible composite armored riser section. The metal armored riser section and the composite armored riser section are arranged in fluid connection to each other. The metal armored riser section comprises at least two cross-wound, tensile armor layers each comprising a plurality of helically wound elongate metal armor elements wound with a winding angle of about 60 degree or less relative to the center axis, and the composite armored riser section comprises at least one tensile armor layer comprising a plurality of helically wound elongate composite armor elements wound with a winding angle of about 60 degree or less relative to the center axis.

Unbonded flexible pipes are well known in the art and are for example described in standard "Recommended Practice for Flexible Pipe", ANSI/API 17 B, fourth Edition, July 2008, and the standard "Specification for Unbonded Flexible Pipe", ANSI/API 17J, Third edition, July 2000.

Such pipes usually comprise an inner liner also often called an inner sealing sheath or an inner sheath, which defines a bore and forms a barrier against the outflow of the fluid which is conveyed in the bore of the pipe, and one or more armor layers surrounding the inner sealing sheath. Usually the armor layer comprises at least one pressure armor layer providing the pipe with resistance against radial stress due to internal pressure (from inside of the pipe and outwards) and the external pressure (from outside of the pipe) which is usually very high and may vary considerably along the length of the pipe, in particular when applied at varying water depths of water as a riser. The pressure armor usually comprises one or more helically wound profiles, wound with a relatively low winding angle to the axis of the pipe, such as about 80 degree or less.

The unbonded flexible pipe also comprises at least one tensile armor layer comprising a plurality of helically wound elongate elements, wound with a relatively high winding degree to the axis of the pipe. Optionally such unbonded flexible pipe can further comprise other layers including an internal armor layer for resistance against crushing of the pipe.

The term "unbonded" means in this text that at least two of the layers including the armoring layers and polymer layers are not bonded to each other. In practice the known pipe normally comprises at least two armoring layers located outside the inner sealing sheath. These armoring layers are not bonded to each other directly or indirectly via other layers along the pipe. Thereby the pipe becomes bendable and sufficiently flexible to roll up for transportation.

The terms "inside" and "outside" a layer of the pipe are used to designate the relative distance to the axis of the pipe, such that "inside a layer" means the area encircled by the layer i.e. with a shorter axial distance than the layer and "outside a layer" means the area not encircled by the layer and not contained by the layer, i.e. with a shorter axial distance than the layer.

In traditional flexible pipes, the armoring layers often comprise metallic armoring layers including a metal carcass typically wound from preformed or folded stainless steel strips and a number of armoring layers in the form of helically wound profiles or wires, where the individual layers may be wound with different winding angles relative to the pipe axis in order to take up the forces caused by internal and external pressure as well as forces acting at the ends of the pipe and shear forces from the surrounding water.

In typical prior art unbonded flexible pipes the armor layers are of metal in order to provide the pipe with sufficient strength.

However, as mentioned above such traditional riser pipes of unbonded flexible pipes are not suitable for use as deep water risers. Attempts to replace the metal of tensile armor layers with composite material in the form of fiber armed polymer strips have shown not to provide a reliable solution. It is believed that one reason could be that a composite tensile armor layer has less strength against turbulent and varying forces while simultaneously subjected to high tensile stress than a metal tensile armor layer.

The present invention has therefore shown to provide a very reliable riser which is expected to have a long lifetime in operation. The riser of the invention is sufficiently strong and durable for deep water applications, and does not require any rigid length sections or complicated buoyancy arrangements.

It should be understood that even though complicated buoyancy arrangements are not required, it can in some situations be an advantage to apply simple buoyancy arrangements to the riser of the invention.

Unless otherwise specified, all sections of the riser and parts thereof should be interpreted to mean length sections along the length of the riser i.e. following the length along the center axis of the riser.

Adjacent sections of the riser mean sections which are in immediate prolongation of each other.

The metal armored riser section comprises at least two cross-wound, tensile armor layers each comprising a plurality of helically wound elongate metal armor elements. Such metal armored element are well known in the art and may in principle have any profiled shape e.g. as described in "Recommended Practice for Flexible Pipe", ANSI/API 17 B, fourth Edition, July 2008, and the standard "Specification for Unbonded Flexible Pipe", ANSI/API 17J, Third edition, July 2000. Examples of profiled elongate armor element(s) comprise one or more of an angular profile, C shaped profile, a U shaped profile, a T shaped profile, an I shaped profile, a K shaped profile, a Z shaped profile, an X shaped profile, a ψ (psi) shaped profile and combinations thereof.

The metal may for example be aluminum and/or steel, preferably duplex steel.

The composite armored riser section comprises at least one tensile armor layer comprising a plurality of helically wound elongate composite armor elements.

The term "composite armor elements" is herein used to mean any elongate armor element, such as strips or bundles of strips, comprising fibre reinforced polymer.

The fibres are advantageously embedded in an at least partly cured polymer matrix. In principle the polymer matrix can be any kind of partly cured polymer matrix. In an embodiment of the invention the polymer matrix is at least about 50% cured. Preferably the polymer matrix is at least about 70% cured, such as at least about 80% cured, such as at least about 90% cured, such as substantially fully cured.

The term "substantially" should herein be taken to mean that ordinary product variances and tolerances are comprised.

In an embodiment of the invention, the polymer matrix of the composite elongate armor elements comprises a thermoset polymer, preferably selected from epoxy resins, vinyl-epoxy-ester resins, polyester resins, polyimide resins, bis-maleimide resins, cyanate ester resins, vinyl resins, benzoxazine resins, benzocyclobutene resins, or mixtures comprising at least one of the forgoing thermoset polymers.

In an embodiment of the invention, the polymer matrix of the composite elongate armor element comprises a thermoplastic polymer, such as polyolefin, polyamide, polyimide, polyamide-imide, polyester, polyurethane, polyacrylate or mixtures comprising at least one of the forgoing thermoplastic polymers.

The fibre reinforced composite elongate armor strips in the reinforcement element of the present invention can be reinforced with any type of fibres. Preferably the composite elongate armor strips comprise fibres selected from basalt fibres, polypropylene fibres, carbon fibres, glass fibres, aramid fibres, steel fibres, polyethylene fibres, mineral fibres and/or mixtures comprising at least one of the foregoing fibres.

Fibre reinforced composite elongate armor strips preferably comprise at least about 10% by weight of fibres, such as from about 20% to about 90% by weight of fibres.

In an embodiment of the invention, the fibres comprise one or more cut fibres and/or filaments. The cut fibres and/or filaments may e.g. be in the form of strands comprising at least one cut fibres and/or filaments, yarns comprising at least one of the cut fibres and/or filaments, rovings comprising at least one of the cut fibres and/or filaments, and/or fibre bundles comprising at least one of the cut fibres and/or filaments. In an embodiment of the invention the fibres comprise a fibre bundle comprising spun, knitted, woven, braided fibres and/or are in the form of a regular or irregular network of fibres and/or a fibre bundle cut from one or more of the foregoing.

The term "cut fibres" means herein fibres of non continuous length, e.g. in the form of chopped fibres or melt blown fibres. The cut fibres are usually relatively short fibres e.g. less than about 5 cm, such as from about 1 mm to about 3 cm in length. The cut fibres may have equal or different lengths.

Filaments are continuous single fibre (also called monofilaments).

The phrase "continuous" as used herein in connection with fibres, filaments, strands or rovings means that the fibres, filaments, strands, yarns or rovings means that they generally have a significant length but should not be understood to mean that the length is perpetual or infinite. Continuous fibres, such as continuous filaments, strands, yarns or rovings preferably have a length of at least about 10 m, preferably at least about 100 m, more preferably at least about 1000 m.

The term "strand" is used to designate an untwisted bundle of filaments.

The term "yarn" is used to designate a twisted bundle of filaments and/or cut fibres. Yarn includes threads and ropes. The yarn may be a primary yarn made directly from filaments and/or cut fibres or a secondary yarn made from yarns and/or cords. Secondary yarns are also referred to as cords.

The term "roving" is used to designate an untwisted bundle of strands or yarns. A roving includes a strand of more than two filaments. A non-twisted bundle of more than two filaments is accordingly both a strand and a roving.

In an embodiment of the invention the major amount, preferably at least about 60% by weight, more preferably substantially all of the fibres are in the form of continuous fibres, such as continuous filaments, continuous yarns, continuous rovings or combinations thereof. The fibers are predominantly oriented with length directions in the elongate direction of the elongate composite armor element.

The elongate armor strips can for example be as the strips described in DK PA 2011 00334, DK PA 2011 00371, DK PA 2012 00185, U.S. Pat. No. 6,165,586, in WO 01/51839 and/or in U.S. Pat. No. 7,842,149.

In an embodiment the composite armored riser section further comprises a pressure armor layer in the form of a composite pressure armor e.g. as described in DK PA 2012 00259.

The metal armored riser section and the composite armored riser section are arranged in fluid connection to each other, preferably with no intermediate pipe sections.

In an embodiment the metal armored riser section and the composite armored riser section are connected directly to each other.

In an embodiment the metal armored riser section is adapted to be arranged closer to the upper facility than the composite armored riser section, the metal armored riser section and the composite armored riser section advantageously being arranged adjacent to each other.

The term "closer to the upper facility" should be construed to mean closer along the length of the riser.

The term 'uppermost' and 'lowermost' when used in connection with the transportation line and parts thereof should be interpreted to mean in relation to the distance along the transportation line determined from the subsea facility i.e. 'uppermost' means with the longest distance along the transportation line to the subsea facility and 'lowermost' means with the shortest distance along the transportation line to the subsea facility.

Usually metal armor layers need to be protected against sea water which otherwise can have a very corrosive effect over time. Therefore an outer sealing sheath is arranged outside the tensile armor layer or layers.

During use of a flexible pipe for transportation of hydrocarbon containing and/or water containing fluids, gasses such a $CO_2$, $H_2S$ and $H_2O$ will often migrate through the inner sealing sheath and into an annular space, also called an annulus, outside the inner sealing sheath provided by the inner sealing sheath and an additional sealing sheath surrounding the inner sealing sheath such as an outer sealing sheath. In the metal armored riser section the tensile armor layer(s) is/are preferably arranged in such annulus in order to protect the metal of the tensile armor layer(s) against corrosion from sea water and in order to protect the metal of the tensile armor layer(s) against corrosion from aggressive gasses, these gasses should preferably be removed from the annulus.

By arranging the metal armored riser section closer to the upper facility than the composite armored riser section i.e. by arranging the metal armored riser section uppermost relative to the composite armored riser section, the metal armored riser section will be subjected to higher tensile forces than the composite armored riser section and simultaneously it will be simpler to reduce the risk of corrosion of the tensile armor of the metal armored riser section. This is because it is simpler and less costly to outgas an annulus closer to the water line than farther from the water line.

The migration of gasses into the annulus—if it is not removed—may become quite considerable and may ultimately result in collapse of the pipe. By the present invention a simple way of avoiding such damage of the pipe is further achieved.

In an embodiment the metal armored riser section comprises a liquid impervious inner sealing sheath defining a bore and sealing against outflow from the bore and a liquid impervious outer sealing sheath sealing against ingress of water and optionally one or more intermediate liquid impervious sheath(s). The liquid impervious sheaths form at least one annulus, and at least one of the cross-wound, tensile armor layers is/are arranged in the annulus.

Advantageously the liquid impervious outer sealing sheath forms an annulus with the inner sealing sheath or with an intermediate liquid impervious sheath, and at least one of the cross-wound, tensile armor layers is/are arranged in this annulus.

The annulus comprising at least one of the cross-wound, tensile armor layers is preferably arranged to be out-gassed, i.e. it comprises a venting system for removing the aggressive gasses.

Suitable venting systems are e.g. the venting systems described in WO 00/17479, WO 00/22336, GB 2349944, US 2008/0149209 and PCT/DK2012/050002 with the difference that the venting system is applied in only part of the length of the riser, namely in one or more the metal armored riser section(s) only.

In an embodiment the annulus of the metal armored riser section comprising at least one of the cross-wound tensile armor layers, comprises a venting opening for allowing fluid to escape from the annulus. For providing effective removal of aggressive gasses the annulus preferably additionally comprises a fluid inlet opening.

Such venting opening advantageously comprises a valve. A suitable valve is e.g. as the valve described in U.S. Pat. No. 6,152,170 or in WO 2010/091691.

The metal armored riser section may for example comprise an adjacent end-fitting, where the venting opening is arranged in the end-fitting.

Advantageously the venting opening is arranged above water line or the venting opening is in fluid connection with a passage leading above the water line.

The composite material of the tensile armor layer(s) of the composite armored riser section need not be protected from sea water, in fact—in order to avoid undesired pressure-build up it is desired that the at least one tensile armor layer of the composite armored riser section is in direct contact with sea water. Preferably the composite armored riser section comprises two or more composite tensile armor layers which preferably are in direct contact with sea water.

By the term "in direct contact with sea water" is meant that the riser is constructed such that the sea water will be in contact with the tensile armor layer(s) of the composite armored riser section applied below the water line.

In the following where the tensile armor layer of the composite armored riser is mentioned in singular it should be construed to include both the embodiment where there is one single tensile armor layer and the embodiment where there are two or more tensile armor layers unless otherwise specified.

In an embodiment the composite armored riser section comprises a liquid impervious inner sealing sheath defining a bore and sealing against outflow from the bore, optionally one or more intermediate liquid impervious sheath(s) arranged closer to the center axis than the tensile armor layer or layers, and optionally a liquid permeable outer protection layer.

Such liquid permeable outer protection layer advantageously is applied for providing mechanical protection e.g. during handling and deployment of the riser.

As mentioned above, the at least one tensile armor layer of the composite armored riser section is advantageously not arranged in an annulus, In an embodiment the composite armored riser section does not comprise any annulus at all and thereby no outgassing is required from the composite armored riser section.

In an embodiment the composite armored riser section comprises an annulus, which annulus is housing a pressure armor layer. The pressure armor layer is advantageously a pressure armor layer comprising at least one helically wound metal armor element, wound with a winding angle of about 70 degree or more, preferably 80 degree or more relative to the center axis. This annulus may or may not comprise a venting opening.

The inventors of the present invention have found that the degradation of metal armor layers due to aggressive gasses such as H2S, is less progressive in areas where the metal is subjected to less dynamic movement than where the metal is subjected to more dynamic movements. Therefore in sections of the riser subjected to less dynamic movements, the risk of degradation of metal of pressure armor layers—which due to winding degrees are subjected to less dynamic movements—is also lower and accordingly such aggressive gasses in an annulus comprising the pressure armor layer and no tensile armor layers, need not be vented to the same degree as an annulus comprising tensile armor layers.

In an embodiment the composite armored riser section comprises an annulus, which annulus is housing a pressure armor layer, wherein this annulus comprises a venting opening with a pressure relief valve exclusively to avoid undesired pressure build-up in the annulus.

In an embodiment the metal armored riser section and the composite armored riser section each have a lowermost end and an uppermost end, at least the uppermost end or the lowermost end of the metal armored riser section is terminated by an end fitting and at least the uppermost end or the lowermost end of the composite armored riser section is terminated by an end-fitting, wherein the end-fitting of the metal armored riser section is connected to the end-fitting of the composite armored riser section.

Suitable end fittings are well known e.g. from WO 01/07818, U.S. Pat. No. 6,360,781, U.S. Pat. No. 6,412,825, U.S. Pat. No. 6,273,142 or U.S. Pat. No. 7,303,213, In an embodiment the metal armored riser section and the composite armored riser section comprises a liquid impervious inner sealing sheath defining a bore and sealing against outflow from the bore, wherein the inner sealing sheath is a common inner sealing sheath for the metal armored riser section and the composite armored riser section.

Where at least the inner sealing sheath of the metal armored riser section and the composite armored riser section are a common inner sealing sheath, i.e. the same inner sealing sheath is continuing in both the metal armored riser section and the composite armored riser section without any intermediate termination of this inner sealing sheath, a more safe hybrid riser is provided, which furthermore is very simple to produce as it will be described further below in the exemplified embodiments.

In an embodiment wherein the metal armored riser section and the composite armored riser section comprise a pressure armor layer, the pressure armor layer optionally is a common pressure armor layer.

Where both the inner sealing sheath and the pressure armor layer of the metal armored riser section and the composite armored riser section are common layers continuing in both the metal armored riser section and the composite armored riser section without any intermediate termination of these layers, a riser with a very high strength is provided, which can be produced in a very cost-effective way. The metal armored riser section and the composite armored riser section may advantageously have a common intermediate liquid impervious sheath arranged around the common pressure armor layer.

In an embodiment the metal armored riser section and the composite armored riser section comprise a carcass, the carcass optionally being a common pressure armor layer.

By having at least one layer continuing in both the metal armored riser section and the composite armored riser section of the riser, the stability and strength of the riser will be increased compared to risers without such common layer.

In embodiments comprising at least one common layer in the metal armored riser section and the composite armored riser section, the riser comprises one or more annular termination units arranged around the outermost common layer and terminating at least one tensile armor layer.

In an embodiment at least one tensile armor layer of the metal armored riser section is terminated in an annular termination unit referred to as a metal armored riser section annular termination unit. Preferably at least the inner sealing sheath is not terminated in the metal armored riser section annular termination unit.

In an embodiment the at least one tensile armor layer of the composite armored riser section is terminated in an annular termination unit referred to as a composite armored riser section annular termination unit. Preferably at least the inner sealing sheath is not terminated in the composite armored riser section annular termination unit.

Any layers located inside the common inner sealing sheath are preferably not terminated.

In an embodiment wherein the metal armored riser section comprises a carcass on the inner side of the inner sealing sheath, the carcass is not terminated in the metal armored riser section annular termination unit.

In an embodiment, wherein the metal armored riser section comprises a pressure armor layer, the pressure armor layer is not terminated in the metal armored riser section annular termination unit. In the same way a common intermediate liquid impervious sheath arranged outside the common pressure armor layer but inside at least one tensile armor layer of each riser section is advantageously not terminated in the metal armored riser section annular termination unit.

Advantageously, the metal armored riser section comprises a liquid impervious outer sealing sheath, and the liquid impervious outer sealing sheath is terminated in a sealing connection in the metal armored riser section annular termination unit. Thereby the metal of the metal tensile armor layer or layers can be protected from sea water.

In an embodiment wherein the composite armored riser section comprises a carcass on the inner side of the inner sealing sheath, the carcass is not terminated in the composite armored riser section annular termination unit.

In an embodiment, wherein the composite armored riser section comprises a pressure armor layer, the pressure armor layer is not terminated in the composite armored riser section annular termination unit.

Where the composite armored riser section comprises a liquid permeable outer protection sheath, the liquid permeable outer protection sheath may be terminated in the composite armored riser section annular termination unit, however, since the liquid permeable outer protection sheath should not seal against ingress of sea water, such termination is not required.

In a preferred embodiment the composite armored riser section annular termination and the metal armored riser section annular termination unit are connected to each other e.g. by being bolded or bonded with epoxy or other strong binder.

Alternatively the composite armored riser section annular termination and the metal armored riser section annular termination unit are integrated to be one single common annular termination unit.

Whether it is more preferred to connect the composite armored riser section annular termination and the metal armored riser section annular termination unit to each other or to apply an integrated composite armored riser section annular termination/metal armored riser section annular termination unit depends on the production facilities applied.

Therefore advantageously at least one tensile armor layer of the metal armored riser section is terminated in a metal armored riser section annular termination unit and the at least one tensile armor layer of the composite armored riser section is terminated in a composite armored riser section annular termination, which is common with the metal armored riser section annular termination unit or which is connected to the metal armored riser section annular termination unit.

The respective sections of the riser may in principle have any length; however, for fully enjoying the advantages of the invention it is preferred that the metal armored riser section has a length of at least about 5 m, such as at least about 10 m, such as at least about 25 m, such as at least about 100 m.

The optimal length of the composite armored riser section depends largely on the total length of the riser and may advantageously be at least about 5 m, such as at least about 10 m, such as at least about 25 m, such as at least about 100 m.

As mentioned above, advantageously the metal armored riser section is arranged uppermost relative to the composite armored riser section. Thereby it is simpler to remove aggressive gasses from an annulus of the metal armored riser section and simultaneously the metal armored riser section can bear the high weight of the riser.

In an embodiment the riser comprises two or more metal armored riser sections. The composite armored riser section is advantageously arranged between two metal armored riser sections.

The riser can for example comprise an uppermost metal armored riser section and a lowermost catenary metal armored riser section providing a touch down point of the riser. Such touch down point of the riser may be subjected to large mechanical stresses due to the movement of the upper facility, whereby the touch down point may be lifted and laid back in touch with the seabed repeatedly. The metal armored riser section has shown to be more suited to withstand such mechanical stresses than the composite armored riser section.

In an embodiment the riser comprises two or more composite armored riser sections, which two or more composite armored riser sections can be identical or can be different from each other. In an embodiment where the riser comprises two or more composite armored riser sections, a first of the composite armored riser sections which is uppermost relative to a second composite armored riser section has a stronger tensile armor layer or layers than this second composite armored riser section.

The invention also relates to an offshore system comprising the riser as described above preferably arranged for transporting fluid between an upper facility and a subsea facility.

All features of the invention as described herein including ranges and preferred ranges can be combined in various ways within the scope of the invention, unless there are specific reasons not to combine such features.

BRIEF DESCRIPTION OF DRAWINGS

The invention will be explained more fully below in connection with a preferred embodiment and with reference to the drawings in which.

Figure 1:
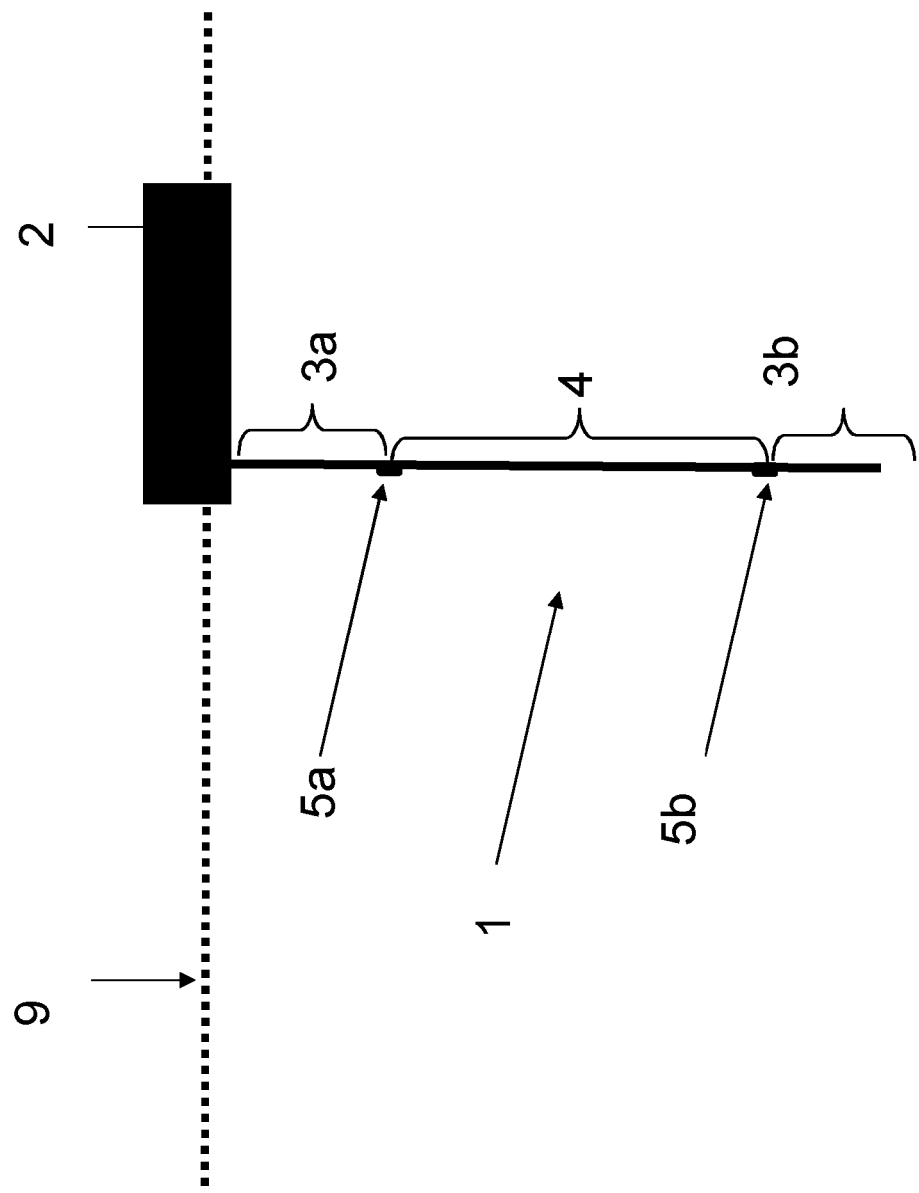
FIG. 1 shows a schematic side view of an offshore system comprising a riser according to the invention.

The offshore system shown in FIG. 1 comprises a riser 1 of the invention arranged for transporting fluid between an upper facility 2 and a not shown subsea facility. The upper facility 2 is a floating unit e.g. a vessel or a platform.

Such a floating unit will often be moored using tethering lines or similar. The upper facility 2 is floating at the water line 9.

The riser 1 of the invention comprises at least three riser sections 3a, 4, and 3b. Advantageously the uppermost riser section 3a is a metal armored riser section. The uppermost riser section is coupled to the lower riser section 4 as indicated with the coupling 5a. The lower riser section 4 is advantageously a composite armored riser section. In its lowermost end the lower riser section 4 is coupled to a lowermost riser section 3b as indicated with the coupling 5b. The lowermost riser section 3b is advantageously a metal armored riser section.

It should be understood that the riser can have any number of riser sections provided that it comprises at least one metal armored riser section and at least one composite armored riser section.

Figure 2:
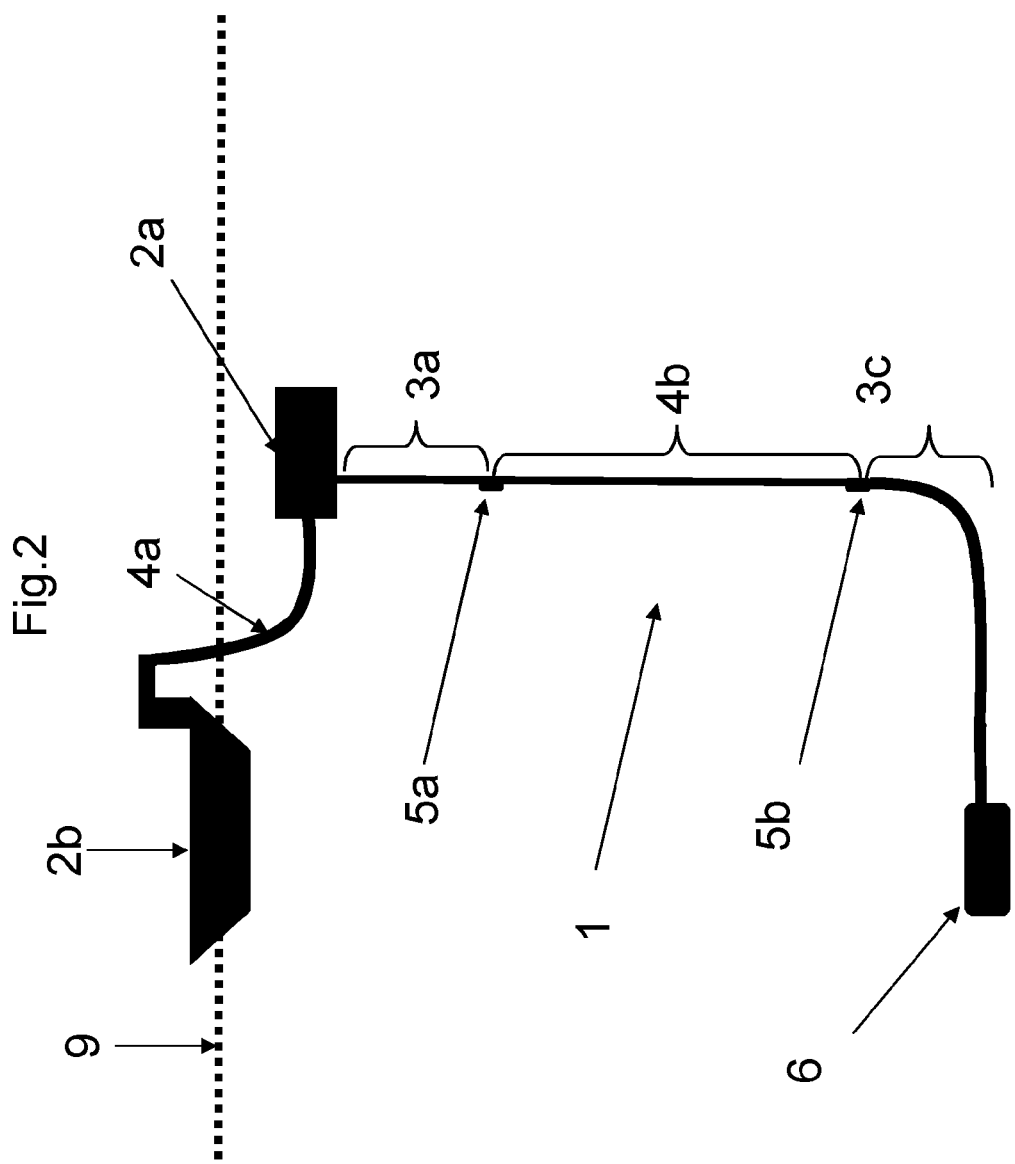
FIG. 2 shows a schematic side view of another offshore system comprising a riser according to the invention.

The offshore system shown in FIG. 2 is a variation of the offshore system of FIG. 1 and comprises a riser 1 of the invention arranged for transporting fluid between an upper facility 2a and a subsea facility 6. The upper facility 2a is arranged below the water line 9 and may for example be a mid water arch or another submerged facility. A vessel 2b is connected to the upper facility 2a 20 via a jumper 4a which can for example be an unbonded flexible pipe with metal armor(s) and/or composite armor(s).

The lowermost riser section 3c of the riser is arranged to have a touch down point where it touches the seabed and leads further to the subsea facility 6. As explained above and as known by the skilled person, such touch down point will repeatedly be lifted from and laid back onto the seabed. The mechanical requirements to the lowermost riser section 3c are therefore high and it is generally desired that such riser section arranged to have a touch down point is a metal armored riser section.

Figure 3:
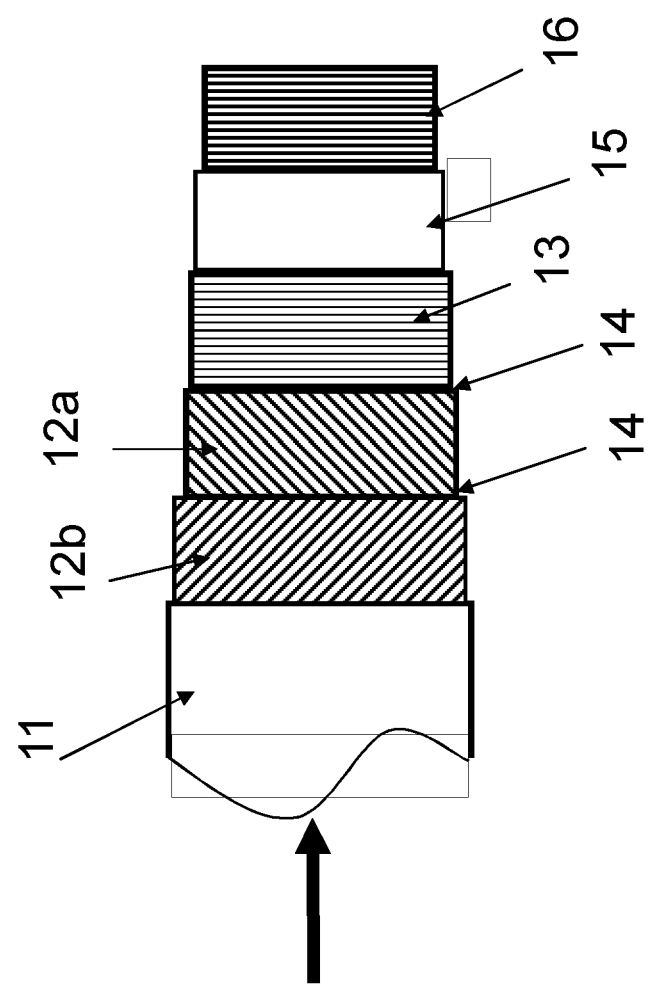
FIG. 3 is a schematic side view of an unbonded flexible metal armored riser section of a riser of the invention.

The metal armored riser section shown in FIG. 3 comprises a liquid impervious inner sealing sheath 15 defining a bore as indicated with the bold arrow. The liquid impervious inner sealing sheath 15 can be of any polymer material suitable for forming such liquid impervious barrier. Examples of suitable polymer materials are high density polyethylene (HDPE), cross linked polyethylene (PEX), polyvinyldifluorid (PVDF) or polyamide (PA). The liquid impervious inner sealing sheath 15 has the purpose of preventing outflow of the fluid transferred in the bore of the riser, indicated with the bold arrow. Inside the liquid impervious inner sealing sheath 15 the riser section comprises an inner armor layer 16, called a carcass which is normally of metal, and has the main purpose of reinforcing the riser section against collapse as described above. The carcass 16 is not liquid tight. On the outer side of the liquid impervious inner sealing sheath 15, the riser section comprises a pressure armor layer 13 which is often of helically wound armor element(s) of metal or composite material, which is wound with a high angle to the center axis of the riser, such an angle to the axis of the riser of about 70 degrees or more e. about 85 degrees. The pressure armor layer 13 is not liquid tight. In the metal armored riser section it is generally desired that also the pressure armor is of metal.

Outside the pressure armor layer 13, the riser section comprises two cross wound tensile armor layers 12a, 12b wound from elongate metal armor elements. For example the elongate armoring elements on the innermost tensile armor layer 12a is wound with a winding degree of about 55 degrees or less to the axis of the riser in a first winding direction and the outermost tensile armor layer 12b is wound with a winding degree of about 60 degrees or less, such as between about 20 and about 55 degrees to the axis of the riser in a second winding direction which is the opposite direction to the first winding direction. The two armor layers with such opposite winding direction are normally referred to as being cross wound. The riser section further comprises a liquid impervious outer sealing sheath 11 protecting the armor layers mechanically and against ingress of sea water. As indicated with the reference number 14, the unbonded flexible riser section preferably comprises anti-friction layers between the armor layers 13, 12a, 12b. The anti-friction layers are not liquid tight, and may for example be in the form of a wound film.

Figure 4:
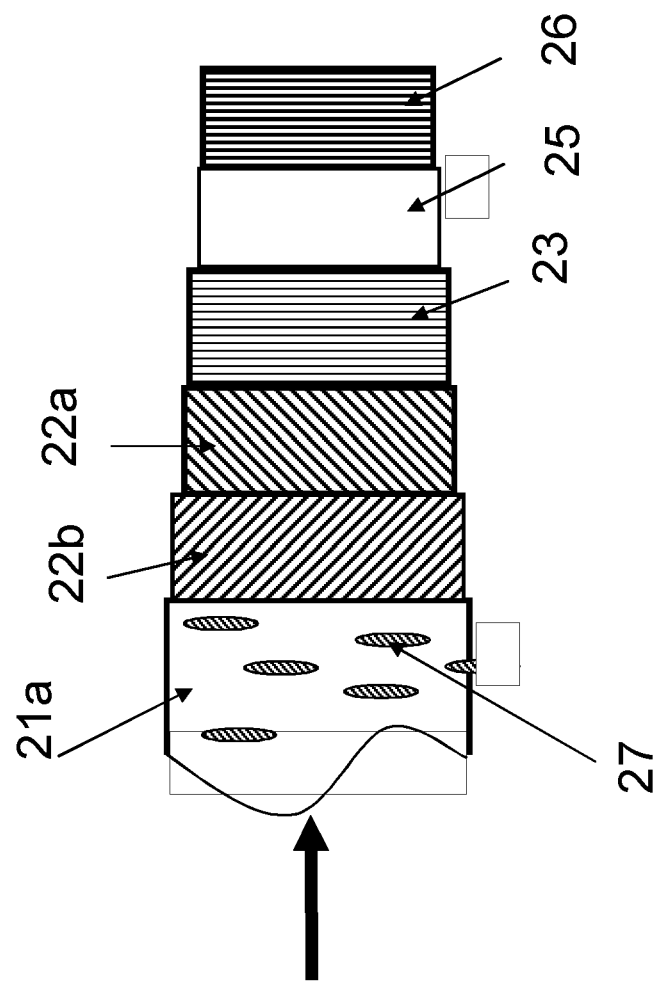
FIG. 4 is a schematic side view of an unbonded flexible composite armored riser section of a riser of the invention.

The composite armored riser section shown in FIG. 4 comprises a liquid impervious inner sealing sheath 25 defining a bore as indicated with the bold arrow. The liquid impervious inner sealing sheath 25 can be of any polymer material suitable for forming such liquid impervious barrier e.g. as described above. The liquid impervious inner sealing sheath 25 can for example be a common layer for both the metal armored riser section and the composite armored riser section.

Inside the liquid impervious inner sealing sheath 25 the riser section comprises an inner armor layer 26, called a carcass which is normally of metal, and may be a common layer for both the metal armored riser section and the composite armored riser section. The carcass 26 is not liquid tight.

On the outer side of the liquid impervious inner sealing sheath 25, the riser section comprises a pressure armor layer 23 which is often of helically wound armor element(s) of metal or composite material, which is wound with a high angle to the center axis of the riser, such as an angle to the axis of the riser of about 70 degrees or more e.g. about 85 degrees. The pressure armor layer 23 is not liquid tight. In the composite armored riser section it is often desired that also the pressure armor is of composite material, however, where very high compression strength is required the pressure armor layer 23 can advantageously be of or comprise metal.

Outside the pressure armor layer 23, the riser section comprises two cross wound tensile armor layers 22a, 22b wound from elongate composite armor elements e.g. cross-wound with the winding degrees described above.

In a not shown variation only the outermost tensile armor layers 22b is wound from elongate composite armor elements and the innermost tensile armor layers 22a is wound from elongate metal armor elements.

The riser section further comprises a liquid permeable outer protecting sheath 21 protecting the armor layers mechanically but allowing ingress of sea water. The liquid permeable outer protecting sheath 21 is perforated with orifices 27 to allow the ingress of sea water.

Figure 5:
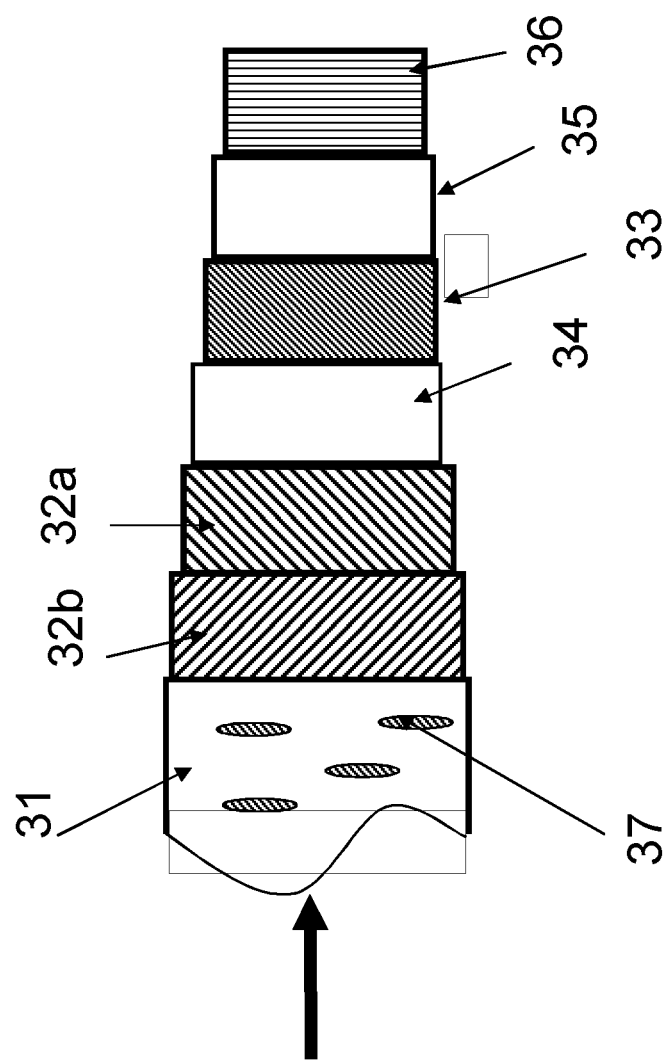
FIG. 5 is a schematic side view of another unbonded flexible composite armored riser section of a riser of the invention.

The composite armored riser section shown in FIG. 5 comprises a liquid impervious inner sealing sheath 35 defining a bore as indicated with the bold arrow. The liquid impervious inner sealing sheath 35 can be of any polymer material suitable for forming such liquid impervious barrier e.g. as described above.

Inside the liquid impervious inner sealing sheath 35 the riser section comprises a not liquid tight carcass 36.

On the outer side of the liquid impervious inner sealing sheath 35, the riser section comprises a pressure armor layer 33 which is often of helically wound armor element(s) of or comprising metal, which is wound with a high angle to the center axis of the riser, such as an angle to the axis of the riser of about 70 degrees or more e.g. about 85 degrees. The pressure armor layer 33 is not liquid tight.

Outside the pressure armor layer 33, the riser section comprises an intermediate liquid impervious sheath 34 protecting the pressure armor layer 33 mechanically and against ingress of sea water.

Outside the intermediate liquid impervious sheath 34, the riser section comprises two cross wound tensile armor layers 32a, 32b wound from elongate composite armor elements e.g. cross-wound with the winding degrees described above.

The riser section further comprises a liquid permeable outer protecting sheath 31 protecting the armor layers mechanically but allowing ingress of sea water. The liquid permeable outer protecting sheath 31 is perforated with orifices 37 to allow the ingress of sea water.

Figure 6:
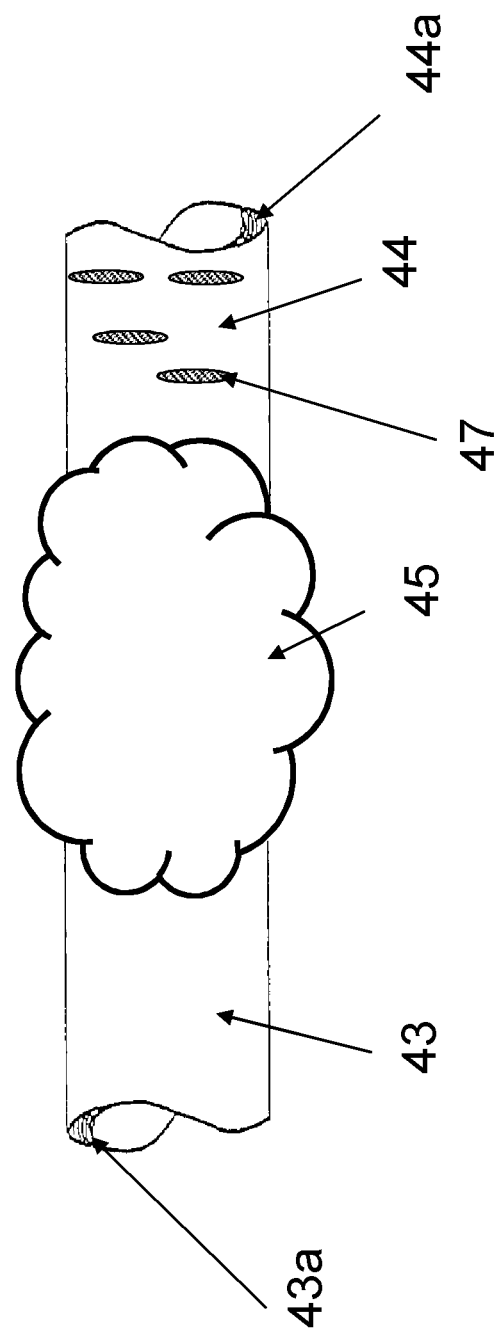
FIG. 6 is a schematic side view of an unbonded flexible composite armored riser section coupled to an unbonded flexible metal armored riser section to provide a riser of the invention.

FIG. 6 shows schematically a length of a riser comprising an unbonded flexible composite armored riser section 44 coupled to an unbonded flexible metal armored riser section 43. The unbonded flexible composite armored riser section 44 has a number of layers 44a as described above and the unbonded flexible metal armored riser section 43 has a number of layers 43a as described above. One or more of the layers 44a of the unbonded flexible composite armored riser section 44 and the layers 43a the unbonded flexible metal armored riser section 43 can advantageously be common to both riser sections 43, 44. The unbonded flexible composite armored riser section 44 can be coupled in a coupling 45 to the unbonded flexible metal armored riser section 43 using any method e.g. as described herein.

Figure 7:
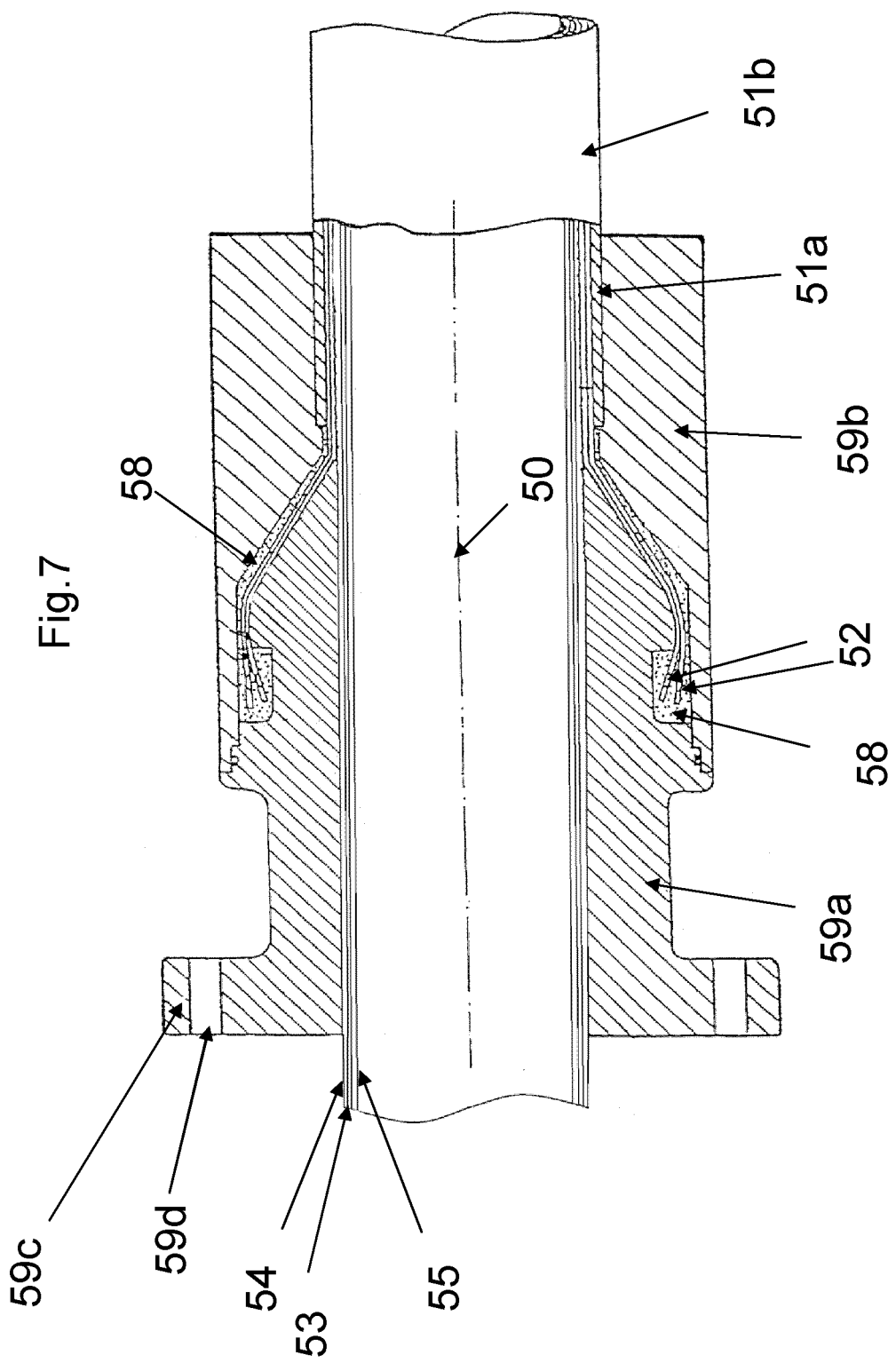
FIG. 7 is a schematic side view of a length part of a riser of the invention comprising at least two riser sections with a common inner sealing sheath, pressure armor and intermediate liquid impervious sheath and comprising an annular termination unit terminating the tensile armor layer of a riser section.

FIG. 7 shows a length part of a riser of the invention comprising at least two riser sections with a common inner sealing sheath 55, pressure armor 53 and intermediate liquid impervious sheath 54. The inner sealing sheath 55 defines the bore with a centre axis 50 of the riser. Only a part of a riser section 51b is seen together with a short length of the common layers extending to the adjacent riser section. The length part of the riser comprises an annular termination unit 59a, 59b terminating the tensile armor layers 52 and the liquid impervious outer sealing sheath 51a of a riser section, which in the shown embodiment is a metal armored riser section 51b.

It should be understood that a corresponding annular termination could be applied to the composite armored riser section with the only difference that the liquid impervious outer sealing sheath 51a preferably would be replaced with a liquid permeable outer protection sheath as described above.

The annular termination unit 59a, 59b comprises a first annular part 59a and a second annular part 59b. The liquid impervious outer sealing sheath 51a is terminated by being fixed mechanically between the first annular part 59a and the second annular part 59b of the annular termination unit. The tensile armor layers 52 are terminated by being fixed using a fixing material 58, such as cement or epoxy or similar in a well known manner. The remaining layers the sealing sheath 55, the pressure armor 53 and the intermediate liquid impervious sheet 54 are common to both the not shown composite armored riser section and the metal armored riser section, and these layers 55, 53, 54 are continuing through the annular termination unit 59a, 59b without being terminated. The first annular part 59a of the annular termination unit comprises a mounting flange 59c with bolt holes 59d for being fixed to a not shown composite armored riser section annular unit.

Figure 8:
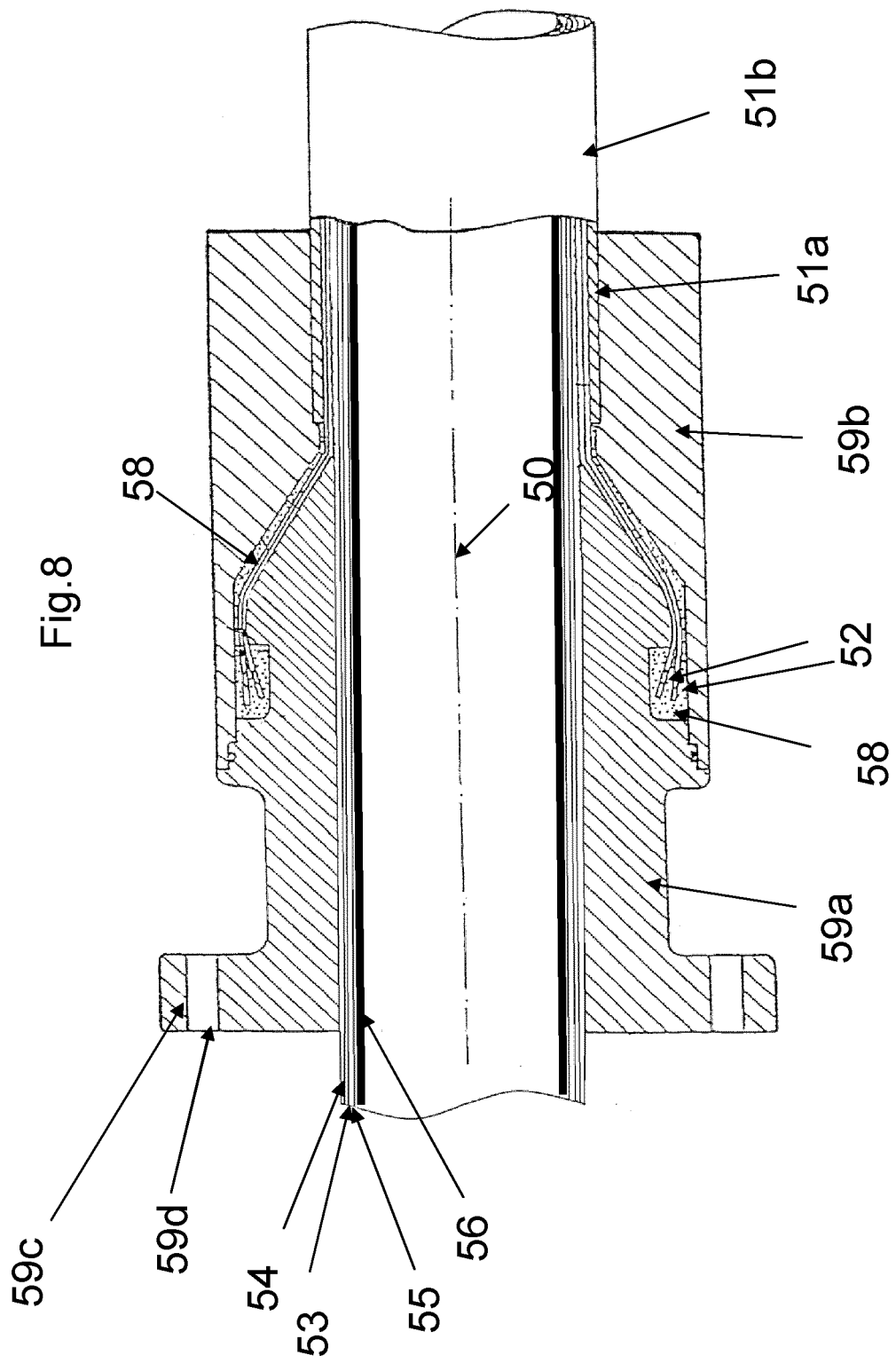
FIG. 8 is a variation of the schematic side view of FIG. 7 where the two riser sections additionally comprise a common carcass.

FIG. 8 shows a length part of another riser of the invention which differs from the riser part length part of FIG. 7 only in that the two adjacent riser sections additionally have a common carcass 56.

Figure 9:
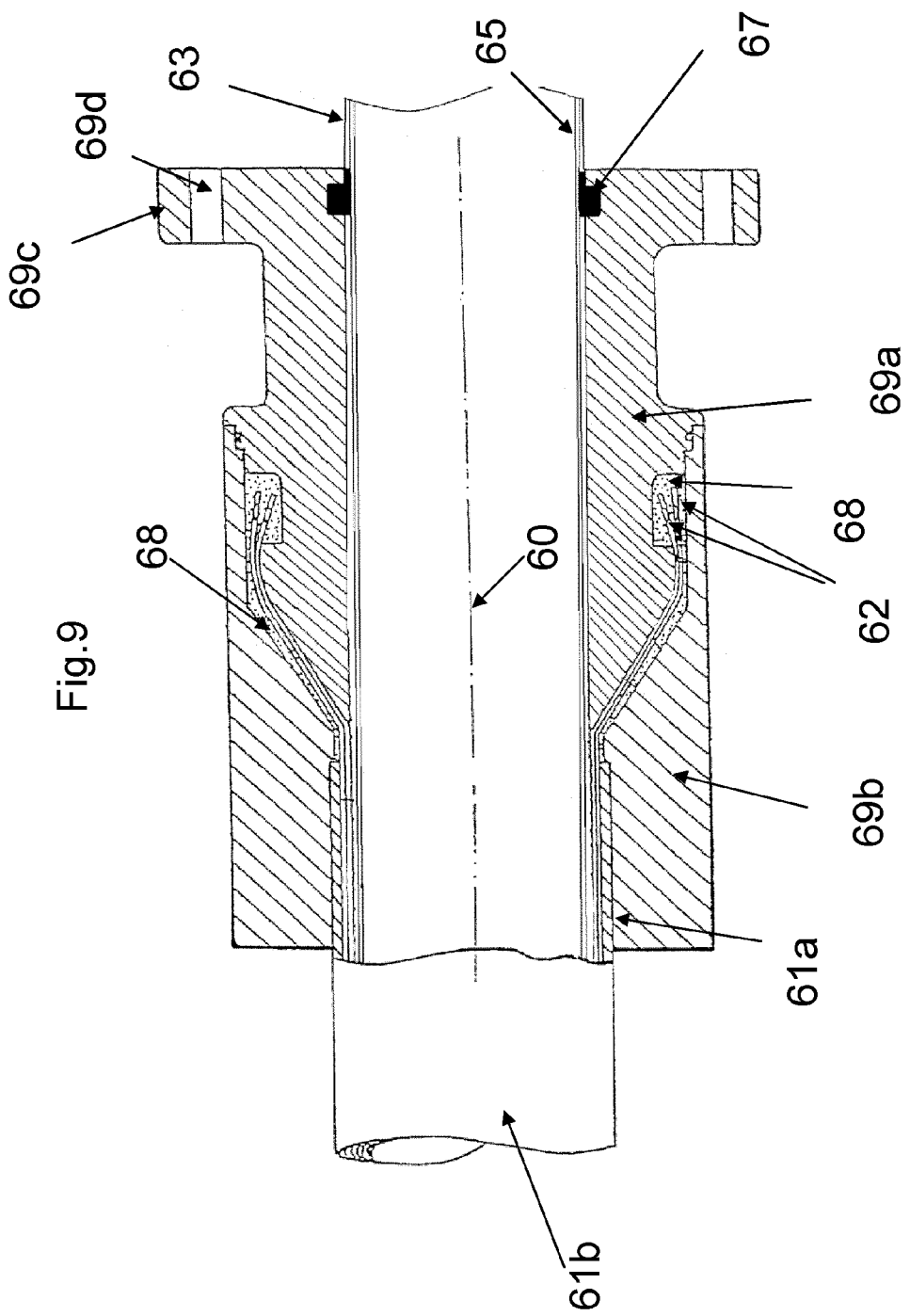
FIG. 9 is a schematic side view of a length part of a riser of the invention comprising at least two riser sections with a common inner sealing sheath and pressure armor, but without an intermediate liquid impervious sheath and comprising an annular termination unit terminating the tensile armor layer of a riser section.

FIG. 9 shows a length part of a riser of the invention comprising at least two riser sections with a common inner sealing sheath 65 and pressure armor 63. Only a part of one of the riser sections 61b is seen together with a short length of the common layers extending to the adjacent riser section. The shown riser section 61b has no intermediate liquid impervious sheath.

The inner sealing sheath 65 defines the bore with a centre axis 60 of the riser. The length part of the riser comprises an annular termination unit 69a, 69b terminating the tensile armor layers 62 and the liquid impervious outer sealing sheath 61a of a riser section which in the shown embodiment is a metal armored riser section 61b.

It should be understood that a corresponding annular termination could be applied to the composite armored riser section with the only difference that the liquid impervious outer sealing sheath 61a preferably would be replaced with a liquid permeable outer protection sheath as described above.

The annular termination unit 69a, 69b comprises a first annular part 69a and a second annular part 69b. The liquid impervious outer sealing sheath 61a is terminated by being fixed mechanically between the first annular part 69a and the second annular part 69b of the annular termination unit. The tensile armor layers 62 are terminated by being fixed using a fixing material 68, such as cement or epoxy or similar in a well known manner. The remaining layers the sealing sheath 65 and the pressure armor 63 are common to both the not shown composite armored riser section and the metal armored riser section 61b, and these layers 65, 63 are continuing through the annular termination unit 69a, 69b without being terminated.

A sealing material 67 such as a polymer and/or cement or epoxy or similar is applied in an annular ring between the first annular part 69a of the annular termination unit to provide a sealing against ingress of sea water from the adjacent composite armored riser section which does not have a liquid impervious outer sealing sheath and therefore allows sea water to enter into the tensile armor layers. In this embodiment it is advantageous that the not shown composite armored riser section either has an intermediate liquid impervious sheath covering the pressure armor which comprises metal or the pressure armor is a composite pressure armor.

The first annular part 69a of the annular termination unit comprises a mounting flange 69c with bolt holes 69d for being fixed to a not shown composite armored riser section annular unit.

Figure 10:
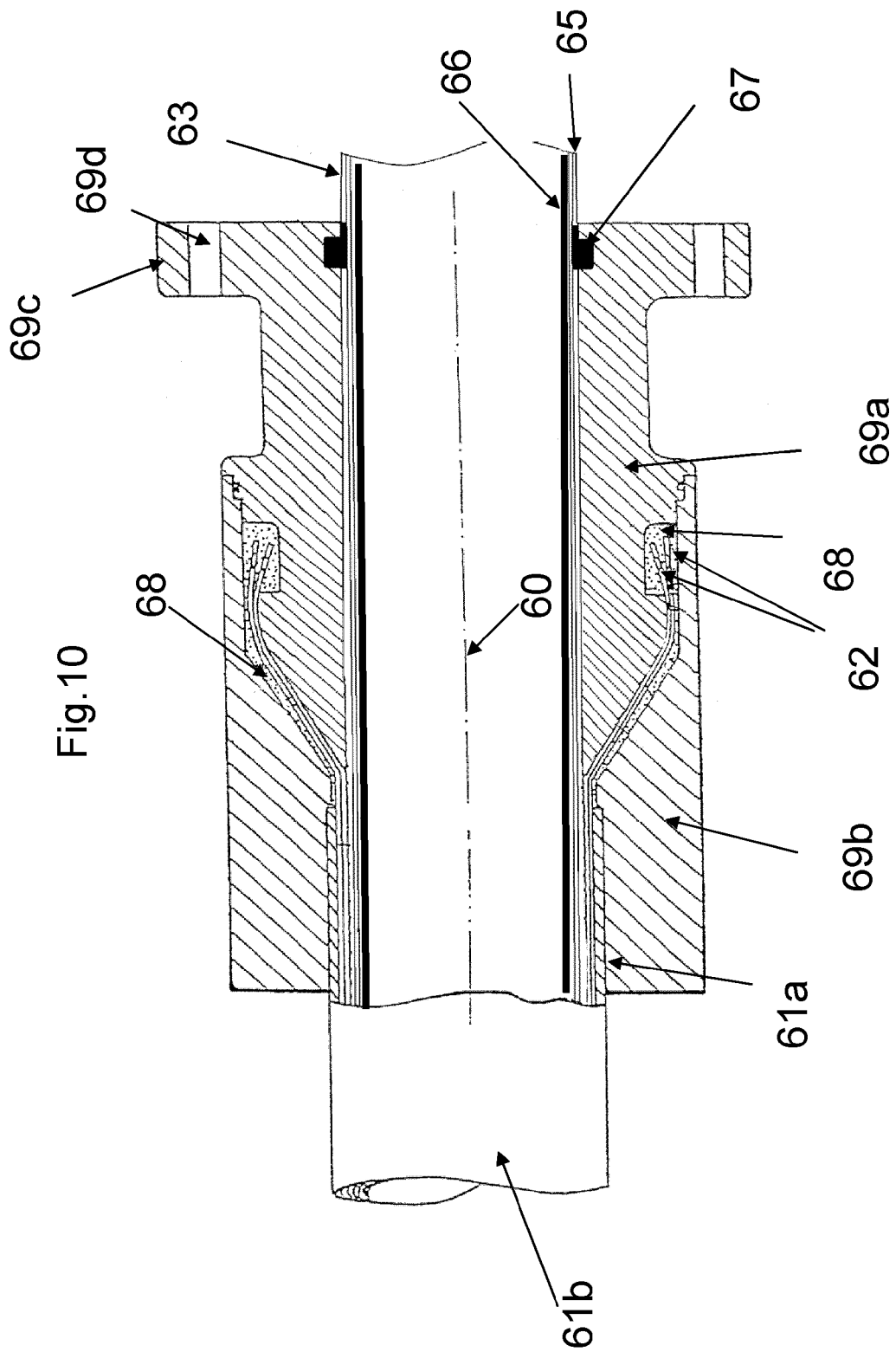
FIG. 10 is a variation of the schematic side view of FIG. 9 where the two riser sections additionally comprise a common carcass.

FIG. 10 shows a length part of another riser of the invention which differs from the riser part length part of FIG. 9 only in that the two adjacent riser sections additionally have a common carcass 66.

Figure 11:
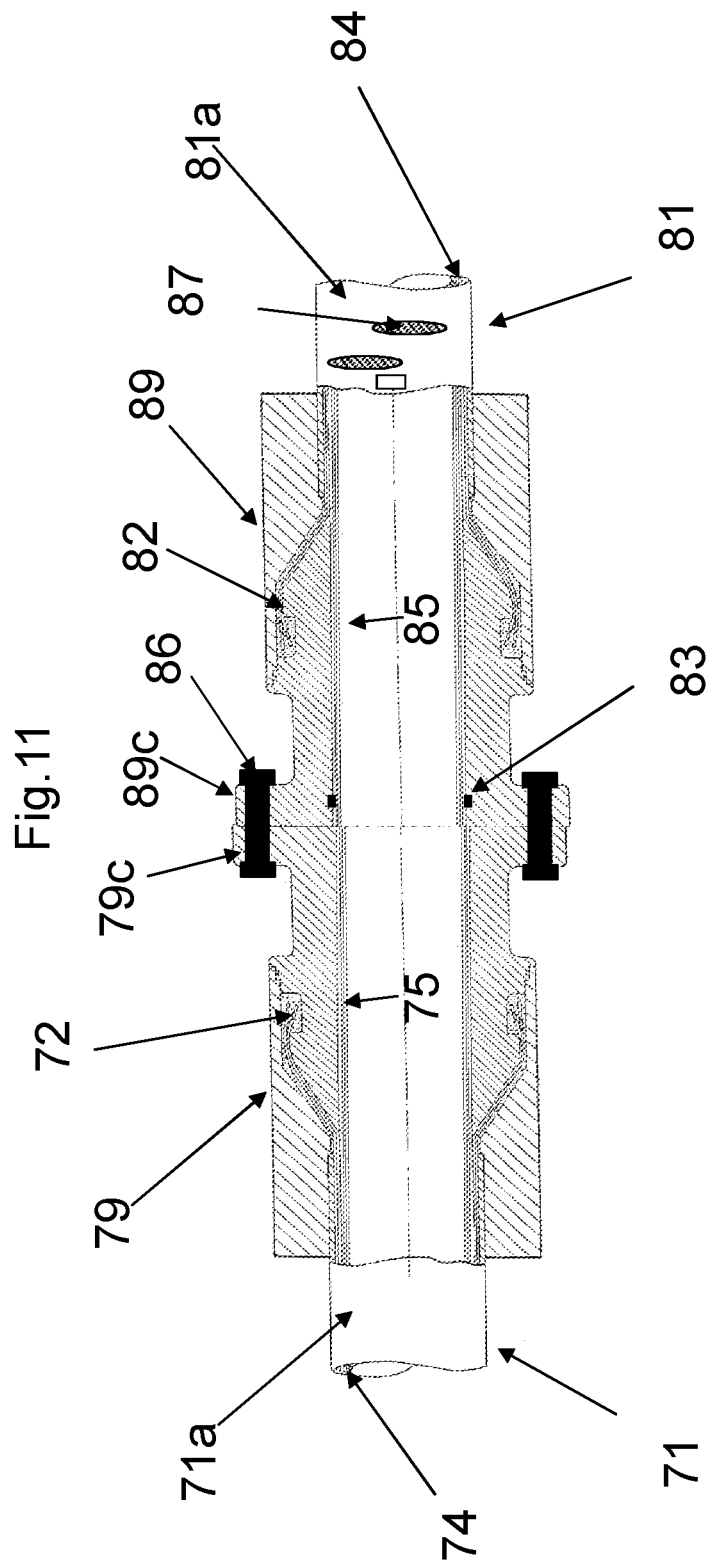
FIG. 11 is a schematic side view of a length part of a riser of the invention comprising an unbonded flexible composite armored riser section coupled to an unbonded flexible metal armored riser section.

FIG. 11 shows a length part of a riser of the invention comprising an unbonded flexible composite armored riser section 81 coupled to an unbonded flexible metal armored riser section 71. The unbonded flexible metal armored riser section 71 comprises a number of layers 74 including a liquid impervious outer sealing sheath 71a, a pair of tensile armor layers 72 of metal and an inner sealing sheath 75, 85. The liquid impervious outer sealing sheath 71a and the tensile armor layers 72 are terminated in an unbonded flexible metal armored riser section annular termination unit 79 comprising a mounting flange 79c.

The unbonded flexible composite armored riser section 81 comprises a number of layers 84 including a liquid permeable outer protection sheath 81a, a pair of tensile armor layers 82 of composite material and an inner sealing sheath 75, 85. The inner sealing sheath 75, 85 of the unbonded flexible composite armored riser section 81 and the inner sealing sheath 75, 85 of the unbonded flexible metal armored riser section 71 is a common inner sealing sheath 75, 85 which is not terminated in any of the annular termination units 79, 89. The unbonded flexible composite armored riser section 81 and the adjacent unbonded flexible metal armored riser section 71 could have several layers in common as described above.

The liquid permeable outer protection sheath 81*a* comprises a number of holes 87 for allowing ingress of sea water into the composite tensile armor layers 82.

The liquid permeable outer protection sheath 81*a* and the tensile armor layers 82 are terminated in an unbonded flexible composite armored riser section annular termination unit 89 comprising a mounting flange 89*c*.

An annular ring shaped sealing material 83 is arranged between the annular termination unit 89 and the outermost of the common layers to provide a seal against ingress of sea water from the composite armored riser section 81 which does not have a liquid impervious outer sealing sheath. This annular ring shaped sealing material 83 is in particular advantageous in case where the unbonded flexible composite armored riser section 81 does not have an intermediate liquid impervious sheath protecting a pressure armor layer comprising metal.

The mounting flange 79*c* is coupled to the mounting flange 89*c* using a number of bolts 86

Figure 12:
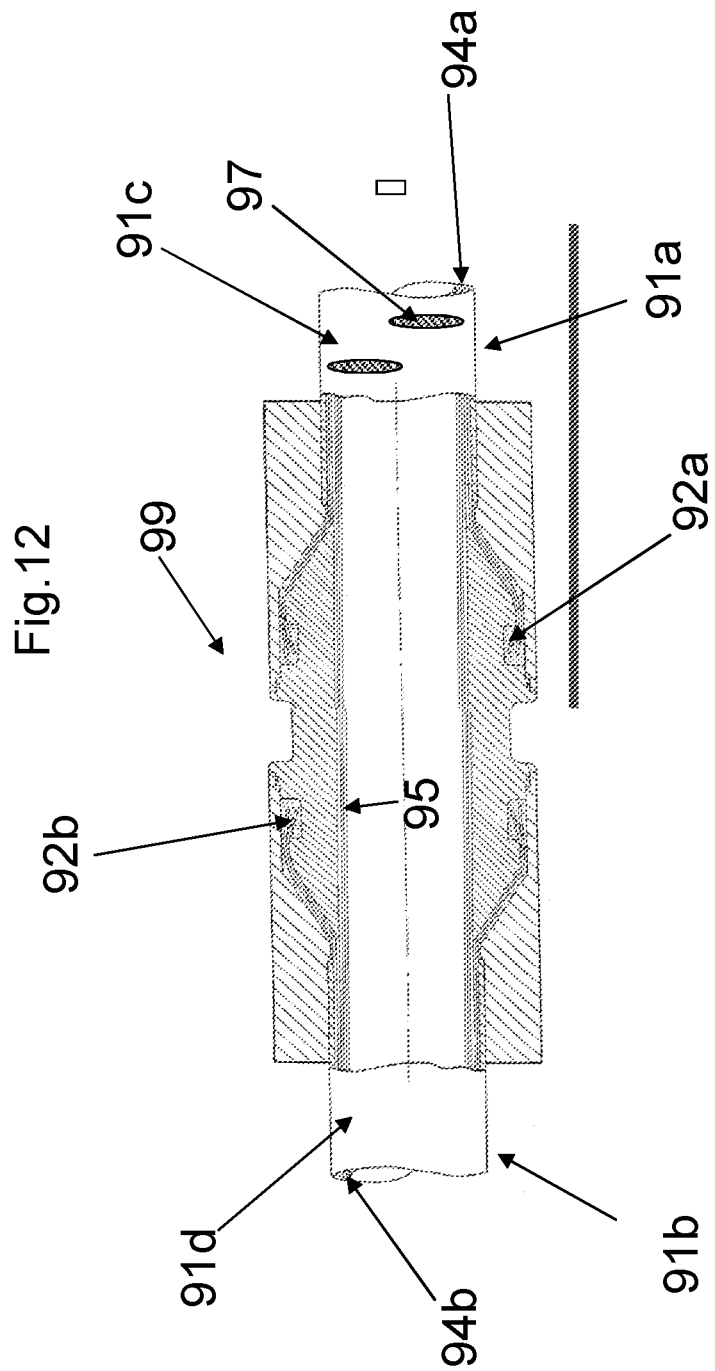
FIG. 12 shows a variation of the riser of FIG. 11.

FIG. 12 shows a length part of a riser of the invention comprising an unbonded flexible composite armored riser section 91*a* coupled to an unbonded flexible metal armored riser section 91*b* using a common annular termination unit 99. The unbonded flexible metal armored riser section 91*b* comprises a number of layers 94*b* including a liquid impervious outer sealing sheath 91*d*, a pair of tensile armor layers 92*b* of metal and an inner sealing sheath 95. The liquid impervious outer sealing sheath 91*d* and the tensile armor layers 92*b* are terminated in a first section of the common annular termination unit 99.

The unbonded flexible composite armored riser section 91*a* comprises a number of layers 94*a* including a liquid permeable outer protection sheath 91*c*, a pair of tensile armor layers 92*a* of composite material and an inner sealing sheath 95 which is a common inner sealing sheath 95 which is not terminated in the common annular termination unit 99. The unbonded flexible composite armored riser section 91*a* and the adjacent unbonded flexible metal armored riser section 91*b* could have several layers in common as described above.

The liquid permeable outer protection sheath 91*c* comprises a number of holes 97 for allowing ingress of sea water into the composite tensile armor layers 92*a*.

The liquid permeable outer protection sheath 81*a* and the tensile armor layers 92*a* are terminated in a second section of the common annular termination unit 99.

Some preferred embodiments have been shown in the foregoing, but it should be stressed that the invention is not limited to these, but may be embodied in other ways within the subject-matter defined in the following claims.

What is claimed is:

1. A riser for transporting fluid between an upper facility and a subsea facility, the riser has a center axis and a length along the center axis and comprises an unbonded flexible metal armored riser section and an unbonded flexible composite armored riser section arranged in fluid connection to each other, said metal armored riser section comprises at least two cross-wound tensile armor layers each comprising a plurality of helically wound elongate metal armor elements wound with a winding angle of about 60 degree or less relative to the center axis, and said composite armored riser section comprises at least one tensile armor layer comprising a plurality of helically wound elongate composite armor elements wound with a winding angle of about 60 degree or less relative to the center axis, wherein the helically wound elongate composite armor elements comprise strips or bundles of strips made of fiber-reinforced polymer.

2. The riser as claimed in claim 1, wherein said metal armored riser section is adapted to be arranged closer to said upper facility than said composite armored riser section, the metal armored riser section and the composite armored riser section advantageously being arranged adjacent to each other.

3. The riser as claimed in claim 1, wherein said metal armored riser section comprises a liquid impervious inner sealing sheath defining a bore and sealing against outflow from said bore and a liquid impervious outer sealing sheath sealing against ingress of water and one or more intermediate liquid impervious sheath(s), said liquid impervious sheaths form at least one annulus, at least one of said cross-wound tensile armor layers being arranged in said annulus.

4. The riser as claimed in claim 3, wherein said annulus comprises a venting opening for allowing fluid to escape from the annulus, and wherein the annulus additionally comprises a fluid inlet opening.

5. The riser as claimed in claim 3, wherein said annulus comprises a venting opening for allowing fluid to escape from the annulus, said venting opening comprises a relief valve.

6. The riser as claimed in claim 3, wherein the annulus additionally comprises a fluid inlet opening.

7. The riser as claimed in claim 3, wherein said annulus comprises a venting opening for allowing fluid to escape from the annulus, said metal armored riser section comprises an adjacent end-fitting, the venting opening is arranged in said end-fitting.

8. The riser as claimed in claim 3, wherein said annulus comprises a venting opening for allowing fluid to escape from the annulus, said venting opening is arranged above water line or the venting opening is in fluid connection with a passage leading above the water line.

9. The riser as claimed in claim 1, wherein at least two or more tensile armor layers of said composite armored riser section are in direct contact with sea water.

10. The riser as claimed in claim 1, wherein said composite armored riser section comprises a liquid impervious inner sealing sheath defining a bore and sealing against outflow from said bore, one or more intermediate liquid impervious sheath(s) arranged closer to the center axis than said tensile armor layer or layers, and a liquid permeable outer protection layer.

11. The riser as claimed in claim 1, wherein said at least two or more tensile armor layers of said composite armored riser section are not arranged in an annulus.

12. The riser as claimed in claim 1, wherein said composite armored riser section does not comprise any annulus.

13. The riser as claimed in claim 1, wherein said composite armored riser section comprises an annulus, said annulus housing a pressure armor layer comprising at least one helically would metal armor element, wound with a winding angle of about 70 degree or more relative to the center axis.

14. The riser as claimed in claim 1, wherein said metal armored riser section and said composite armored riser section each have a lowermost end and an uppermost end, at least the uppermost end or the lowermost end of said metal armored riser section is terminated by an end fitting and at least the uppermost end or the lowermost end of said composite armored riser section is terminated by an end-fitting, wherein the end-fitting of the metal armored riser section is connected to the end-fitting of the composite armored riser section.

15. The riser as claimed in claim 1, wherein said metal armored riser section and said composite armored riser section comprise a liquid impervious inner sealing sheath defining a bore and sealing against outflow from said bore, wherein said inner sealing sheath is a common inner sealing sheath for said metal armored riser section and said composite armored riser section.

16. The riser as claimed in claim 1, wherein said metal armored riser section and said composite armored riser section comprise a pressure armor layer, said pressure armor layer being a common pressure armor layer.

17. The riser as claimed in claim 1, wherein said metal armored riser section and said composite armored riser section comprise a carcass, said carcass being a common pressure armor layer.

18. The riser as claimed in claim 3, wherein at least one tensile armor layer of said metal armored riser section is terminated in a metal armored riser section annular termination unit, at least the inner sealing sheath is not terminated in said metal armored riser section annular termination unit.

19. The riser as claimed in claim 3, wherein said at least one tensile armor layer of said composite armored riser section is terminated in a composite armored riser section annular termination unit, at least the inner sealing sheath is not terminated in said composite armored riser section annular termination unit.

20. The riser as claimed in claim 3, wherein at least one tensile armor layer of said metal armored riser section is terminated in a metal armored riser section annular termination unit, the metal armored riser section comprises a carcass on the inner side of said inner sealing sheath, said carcass is not terminated in said metal armored riser section annular termination unit.

21. The riser as claimed in claim 1, wherein at least one tensile armor layer of said metal armored riser section is terminated in a metal armored riser section annular termination unit, the metal armored riser section comprises a pressure armor layer, said pressure armor layer is not terminated in said metal armored riser section annular termination unit.

22. The riser as claimed in claim 18, wherein at least one tensile armor layer of said metal armored riser section is terminated in a metal armored riser section annular termination unit, the metal armored riser section comprises a liquid impervious outer sealing sheath, said liquid impervious outer sealing sheath is terminated in a sealing connection in the metal armored riser section annular termination unit.

23. The riser as claimed in claim 1, wherein said at least one tensile armor layer of said composite armored riser section is terminated in a composite armored riser section annular termination unit, the composite armored riser section comprises a carcass on the inner side of said inner sealing sheath, said carcass is not terminated in said composite armored riser section annular termination unit.

24. The riser as claimed in claim 1, wherein said at least one tensile armor layer of said composite armored riser section is terminated in a composite armored riser section annular termination unit the composite armored riser section comprises a pressure armor layer, said pressure armor layer is not terminated in said composite armored riser section annular termination unit.

25. The riser as claimed in claim 1, wherein said at least one tensile armor layer of said composite armored riser section is terminated in a composite armored riser section annular termination unit, the composite armored riser section comprises a liquid permeable outer protection sheath, said liquid permeable outer protection sheath is terminated in the composite armored riser section annular termination unit.

26. The riser as claimed in claim 1, wherein at least one tensile armor layer of said metal armored riser section is terminated in a metal armored riser section annular termination unit and said at least one tensile armor layer of said composite armored riser section is terminated in a composite armored riser section annular termination unit, the composite armored riser section annular termination and the metal armored riser section annular termination unit are connected to each other.

27. The riser as claimed in claim 1, wherein at least one tensile armor layer of said metal armored riser section is terminated in a metal armored riser section annular termination unit and said at least one tensile armor layer of said composite armored riser section is terminated in a composite armored riser section annular termination unit, the composite armored riser section annular termination and the metal armored riser section annular termination unit are integrated to be one single common annular termination unit.

28. The riser as claimed in claim 1, wherein at least one tensile armor layer of said metal armored riser section is terminated in a metal armored riser section annular termination unit and said at least one tensile armor layer of said composite armored riser section is terminated in a composite armored riser section annular termination, which is common with the metal armored riser section annular termination unit or which is connected to the metal armored riser section annular termination unit.

29. The riser as claimed in claim 1, wherein said metal armored riser section has a length of at least about 5 m.

30. The riser as claimed in claim 1, wherein said composite armored riser section has a length of at least about 5 m.

31. The riser as claimed in claim 1, wherein said metal armored riser section is arranged uppermost relative to said composite armored riser section.

32. The riser as claimed in claim 1, wherein said riser comprises two or more metal armored riser sections.

33. The riser as claimed in claim 1, wherein said composite armored riser section is arranged between two metal armored riser sections.

34. The riser as claimed in claim 1, wherein said riser comprises two or more composite armored riser sections.

35. An offshore system comprising a riser for transporting fluid between an upper facility and a subsea facility, the riser has a center axis and a length along the center axis and comprises an unbonded flexible metal armored riser section and an unbonded flexible composite armored riser section arranged in fluid connection to each other, said metal armored riser section comprises at least two cross-wound tensile armor layers each comprising a plurality of helically wound elongate metal armor elements wound with a winding angle of about 60 degree or less relative to the center axis, and said composite armored riser section comprises at least one tensile armor layer comprising a plurality of helically wound elongate composite armor elements wound with a winding angle of about 60 degree or less relative to the center axis, wherein the helically wound elongate composite armor elements comprise strips or bundles of strips made of fiber-reinforced polymer.

36. The offshore system of claim 35, wherein the riser is arranged for transporting fluid between an upper facility and a subsea facility.

* * * * *